US012576870B2

(12) United States Patent
Altekar et al.

(10) Patent No.: US 12,576,870 B2
(45) Date of Patent: Mar. 17, 2026

(54) VULNERABLE ROAD USER IDENTIFICATION SYSTEM

(71) Applicant: FORD GLOBAL TECHNOLOGIES, LLC, Dearborn, MI (US)

(72) Inventors: Niraj Altekar, Mumbai (IN); Michael Ryan, Bradford, PA (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 18/375,089

(22) Filed: Sep. 29, 2023

(65) Prior Publication Data

US 2025/0108818 A1     Apr. 3, 2025

(51) Int. Cl.
| | |
|---|---|
| *B60W 50/14* | (2020.01) |
| *B60W 30/09* | (2012.01) |
| *B60W 30/095* | (2012.01) |
| *G08G 1/16* | (2006.01) |
| *H04B 10/116* | (2013.01) |

(52) U.S. Cl.
CPC ............ *B60W 50/14* (2013.01); *B60W 30/09* (2013.01); *B60W 30/0956* (2013.01); *G08G 1/162* (2013.01); *G08G 1/166* (2013.01); *H04B 10/116* (2013.01); *B60W 2050/143* (2013.01); *B60W 2050/146* (2013.01); *B60W 2554/402* (2020.02); *B60W 2554/4041* (2020.02); *B60W 2554/4044* (2020.02); *B60W 2556/45* (2020.02)

(58) Field of Classification Search
CPC ..................................................... H04B 10/116
See application file for complete search history.

(56) References Cited

U.S. PATENT DOCUMENTS

| | | | | |
|---|---|---|---|---|
| 11,293,758 | B2 * | 4/2022 | Hamilton | ............... G08G 1/017 |
| 2005/0187701 | A1 * | 8/2005 | Baney | ............. G08G 1/096716 |
| | | | | 340/907 |
| 2018/0093675 | A1 * | 4/2018 | Holub | ............... B60W 60/0059 |
| 2018/0136643 | A1 * | 5/2018 | Tao | ...................... G05D 1/0231 |
| 2018/0217229 | A1 * | 8/2018 | Shukla | .................... G01S 17/42 |
| 2020/0211386 | A1 * | 7/2020 | Takahashi | ............ G08G 1/0112 |
| 2021/0024061 | A1 * | 1/2021 | Visintainer | ....... B60W 30/0956 |
| 2021/0287529 | A1 * | 9/2021 | Beauchamp | ........... G08G 1/161 |
| 2022/0161815 | A1 | 5/2022 | Van Beek et al. | |

(Continued)

FOREIGN PATENT DOCUMENTS

| | | | | |
|---|---|---|---|---|
| CN | 202857947 U | 4/2013 | | |
| CN | 112874518 A | * 6/2021 | ........ B60W 30/0953 |
| DE | 102020115117 A1 | 12/2021 | | |

OTHER PUBLICATIONS

English Translation of CN112874518A (Year: 2021).*

*Primary Examiner* — Anshul Sood
(74) *Attorney, Agent, or Firm* — Joseph Zane; Brooks Kushman P.C.

(57)     ABSTRACT

A vehicle including a human machine interface (HMI); a light sensor configured to receive a light pulse emitted from an illumination device, wherein the light pulse includes an original message in a modulated format; and one or more controllers programmed to demodulate the light pulse to obtain the original message, wherein the original message identifies an object on which the illumination device is attached, convert the original message into a processed message, and output the processed message via the HMI.

14 Claims, 2 Drawing Sheets

(56)  References Cited

U.S. PATENT DOCUMENTS

2022/0329990 A1* 10/2022 Priziment ........ G08G 1/096741
2023/0095099 A1*  3/2023 Konopka ................ G08G 1/22
                                                        701/25

* cited by examiner

100

200

VULNERABLE ROAD USER
IDENTIFICATION SYSTEM

TECHNICAL FIELD

The present disclosure generally relates to a vehicle system. More specifically, the present disclosure relates to a vehicle system to increase the conspicuity of vulnerable road users.

BACKGROUND

Vulnerable road users (VRUs) generally refer to road users that are unprotected by an outside shield such as a vehicle body. Typical examples of vulnerable road users include pedestrians, bicyclists, and roadway workers. If a vehicle driver notices the presence the vulnerable road users ahead of time, he/she may perform corresponding maneuvers (e.g., reducing speed, leaving a wider space) before encountering the vulnerable road users.

SUMMARY

In one or more illustrative examples of the present disclosure, a vehicle including a human machine interface (HMI); a light sensor configured to receive a light pulse emitted from an illumination device, wherein the light pulse includes an original message in a modulated format; and one or more controllers programmed to demodulate the light pulse to obtain the original message, wherein the original message identifies an object on which the illumination device is attached, convert the original message into a processed message, and output the processed message via the HMI.

In one or more illustrative examples of the present disclosure, a method for a vehicle includes responsive to receiving, via a light senor, a light pulse emitted from an illumination device, demodulating the light pulse to obtain an original message identifying an object; detecting, via a second sensor, the object; and performing, via one or more controllers of a vehicle, a driving maneuver to evade the object.

In one or more illustrative examples of the present disclosure, an illumination device includes an emitter configured to emit visible light; a processor programmed to: generate a message indicative of a location of the illumination device; modulate the message into a light pulse; and broadcast the light pulse together with the visible light via the emitter.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes vehicle system for detecting and identifying vulnerable road users. More specifically, the present disclosure proposes a vehicle system for detecting and identifying vulnerable road users using light pulse emitted from a illumination device associated with the vulnerable road users.

Figure 1:
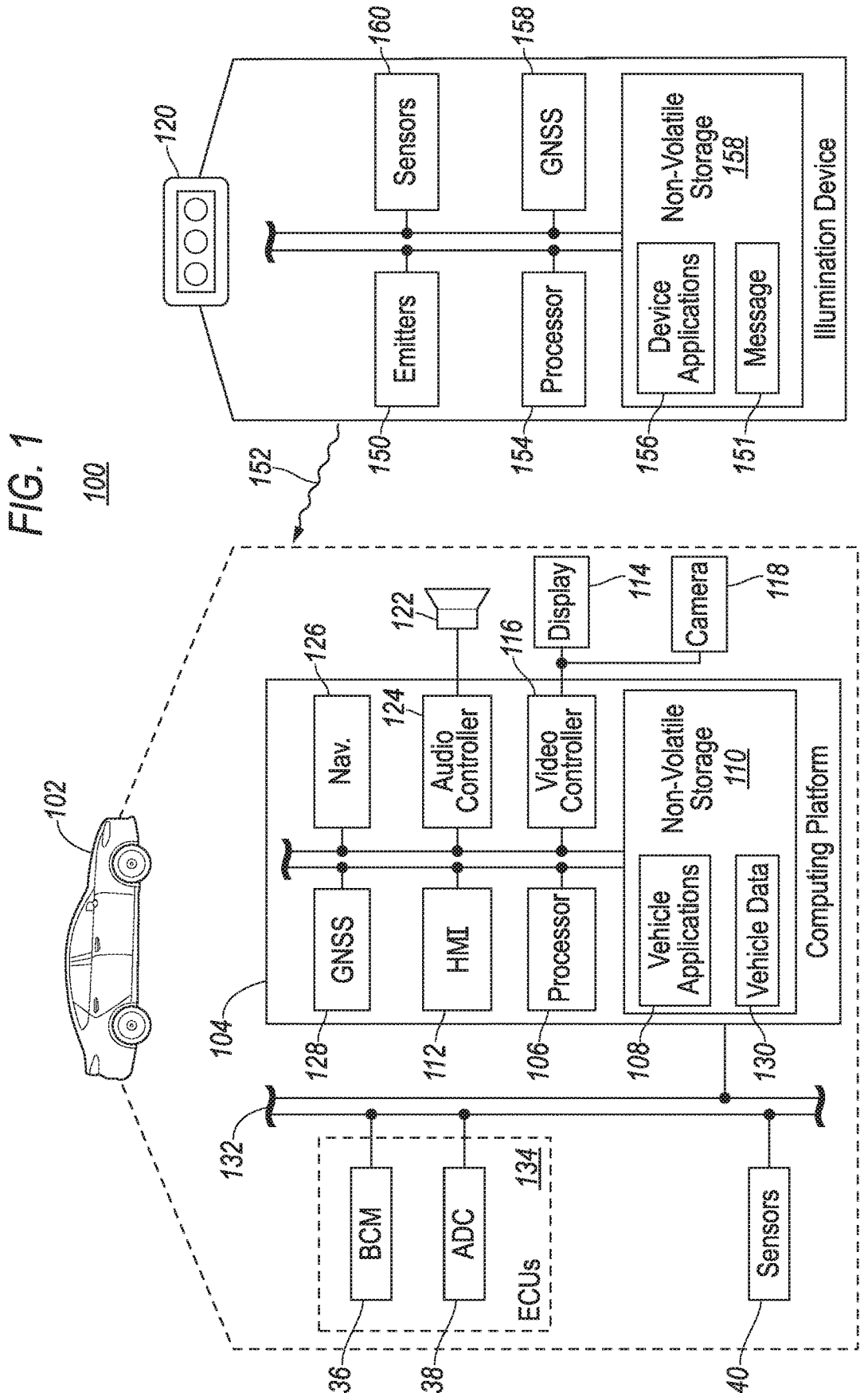
FIG. 1 illustrates an example block topology of a vehicle system for identifying an illumination device associated with a vulnerable road user of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), a parallel/series hybrid vehicle (PSHEV), or a fuel-cell electric vehicle (FCEV), a boat, a plane or other mobile machine for transporting people or goods. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, data processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 104 may be provided with various features allowing the vehicle occupants/users to interface with the computing platform 104. For example, the computing platform 104 may receive input from human machine interface (HMI) controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more cameras 118 configured to provide visual input by way of the video controller 116. As an example, the camera 118 may be a dash camera located within the vehicle cabin and configured to capture images/ videos in the forward direction of the vehicle 102. In the present disclosure, the camera 118 may be used as a light receiver configured to receive light pulse emitted from an illumination device 120. (To be discussed in detail below.) The computing platform 104 may also drive or otherwise communicate with one or more speakers 122 configured to provide audio output and input to vehicle occupants by way of an audio controller 124.

The computing platform 104 may also be provided with navigation and route planning features through a navigation controller 126 configured to calculate navigation routes responsive to user input via e.g., the HMI controls 112, and output planned routes and instructions via the speaker 122 and the display 114. Location data that is needed for navigation may be collected from a global navigation satellite system (GNSS) controller 128 configured to communicate with multiple satellites and calculate the location of the vehicle 102. The GNSS controller 128 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 130. Navigation software may be stored in the storage 110 as one the vehicle applications 108.

The computing platform 104 may be further configured to communicate with various components of the vehicle 102 via one or more in-vehicle network 132. The in-vehicle network 132 may include, but is not limited to, one or more of a controller area network (CAN), an Ethernet network, and a media-oriented system transport (MOST), as some examples. Furthermore, the in-vehicle network 132, or portions of the in-vehicle network 132, may be a wireless network accomplished via Bluetooth low-energy (BLE), Wi-Fi, or the like.

The computing platform 104 may be configured to communicate with various electronic control units (ECUs) 134 of the vehicle 102 configured to perform various operations. The ECUs 134 may include a body control module (BCM) 136 configured to control various body operations of the vehicle 102. For instance, the BCM 136 may be configured to control the door and/or trunk lock/unlock operations of the vehicle 102. The BCM 136 may be further configured to control the light and/or horn operations of the vehicle 102. The BCM 136 may be further configured to control the wiper operations of the vehicle 102. The ECUs 134 may further include an autonomous driving controller (ADC) 138 configured to control the autonomous driving operations of the vehicle 102.

The vehicle 102 may be provided various sensors 140 configured to enable various measurements and generate sensors data. For instance, the sensors 140 may include an ultrasonic sensor 140 (e.g. parking sensors 140) configured to detect an object at a vicinity of the vehicle 102. The sensors 140 may further include a lidar sensor 140 configured to detect an object at a farther distance (e.g. in a few hundreds meters). Additionally, the sensors 140 may further include a light sensor 140 configured to receive the light pulse emitted from the illumination device 120 in addition to or in lieu of the camera 118. In the present disclosure, the term light sensor may be collectively used to refer to both one or more sensors 140 provided with light detecting capability and the camera 118.

The computing platform 104 may be configured to communicate with the illumination device 120 to obtain the information about the user of the illumination device 120. The illumination device 120 may be any of a variety types of portable devices provided with illumination capabilities, such as flashlight, a helmet light, a headlight and/or taillight of a bicycle, a wearable device (e.g. a watch), a mobile phone, a tablet or the like. The illumination device 120 may be provided with one or more light emitters 150 configured to emit a light pulse 152 to convey a message 151 indicative of the information about the user of the illumination device 120 to the vehicle 102 as well as other entities participating road traffic. The light emitters 150 may include one or more light emitting elements such as light-emitting diodes (LEDs) for general illumination. In an example, the light emitter 150 may be configured to emit visible light, such as light having a wavelength range of 400 to 700 nm when activated. Additionally or alternatively, the light emitter 150 may be configured to emit infra-red light with longer wavelength that is invisible by human eyes.

Regardless of the specific wavelength used, the illumination device 120 may further include a processor 154 configured to process digital signals and modulate the message 151 into the light pulse 152 to convey a low volume, low bit rate digital information to surroundings via the light emitter 150. The modulation may be facilitated via device applications 156 stored in a computer-readable storage medium 158. The computer-readable medium 158 (also referred to as a processor-readable medium or storage) includes any non-transitory medium (e.g., tangible medium) that participates in providing instructions or other data that may be read by the processor 154 of the illumination device 120.

Once the light pulse 152 is captured by a compatible receiver of the vehicle 102 such as the camera 118 and/or the light sensor 140, the light pulse 152 may be demodulated into a digital signal by the processor 106 of the vehicle 102.

The message 151 that is incorporated into the light emitted by the light emitter 150 may be a prerecorded message 151 stored in the storage 158. For instance, the message 151 may include an identifier of the user of the illumination device 120. The identifier may be temporary to preserve anonymity of the user. Alternatively, the identifier may be a permanent identifier associated with the user. The message 151 may further include a road user category of the user. As a few non-limiting examples, the road user category may include a pedestrian category, a road-worker category, a bicyclist category, a scooter category, a skateboarder category, a wheelchair user category or the like.

In addition to the prerecorded information, the message 151 may further include dynamic information indicative of a current condition and intent of the user. For instance, the message 151 may further include a current location of the illumination device 120 presented in the latitude, longitude, and elevation format. The location data used in the message 151 may be obtained by a GNSS controller 158 of the illumination device 120. Additionally, the message 151 may further include motion information such as speed and heading direction of the of the illumination device 120. Additionally, the message 151 may further include user intention information (e.g., street crossing intention) of the user associated with the illumination device 120. The processor 154 may determine the user intention using a current route trajectory as indicated by the location data from the GNSS controller 158 as well as sensor data collected via various sensors 160. Additionally or alternatively, the user intention may be determined via navigation applications 156, and/or learned behavior of the vulnerable road user (e.g. learned behavior from artificial intelligence and machine learning models). The sensors 160 may include a gyroscope 160 configured to detect an orientation and level of the illumination device 120. The sensors 160 may further include speed change sensor 160 configured to detect a speed change and vibration of the illumination device 120. In some examples, the message 151 be in the form of a PSM message, such as the Standard Messages as specified in the SAE J2735 Standard.

The present disclosure proposes a method for increasing the visibility of the vulnerable road user by utilizing the illumination device 120 to broadcast messages 151 to other road participants such as the vehicle 102. The illumination device 120 may be associated with a vulnerable road user participating road traffic. For instance, the illumination device 120 may be worn by, carried by, or attached to the road user.

The vulnerable road user may use the illumination device 120 for lighting and visibility purposes. This may include allowing the road user to better view his or her surroundings as well as allowing the road user to be more visible to others. For instance, the illumination device 120 may be a helmet light 120 or a bicycle headlight 120 configured to illuminate the road ahead of the vulnerable road user. In some cases, the illumination device 120 may be reverse-biased or omnidirectionally-biased such that the visible light may be visible from not only the forward direction of the illumination device 120, but also from the rearward or other directions. Additionally or alternatively, the illumination device 120 may be a bicycle taillight 120 configured to provide solid or flashing red light to make the vulnerable road user more visible to vehicles approaching from the behind. Similarly, the bicycle taillight 120 may be forward-biased or omnidirectionally-biased to allow other entities to see light from not only the rearward direction from the vulnerable road user, but also other directions.

The illumination device 120 may be configured to provide illumination and message broadcasting operations using the emitter 150 at the same time. In some examples, the illumination and the message broadcasting operations may be independently controlled. For instance, the emitter 150 may be activated to provide light for illumination without broadcasting messages 151. Alternatively, the illumination and message broadcasting operations may be collective controlled and the emitter 150 may be configured to broadcast messages 151 as long as the illumination device 120 is switched on for providing illumination.

Figure 2:
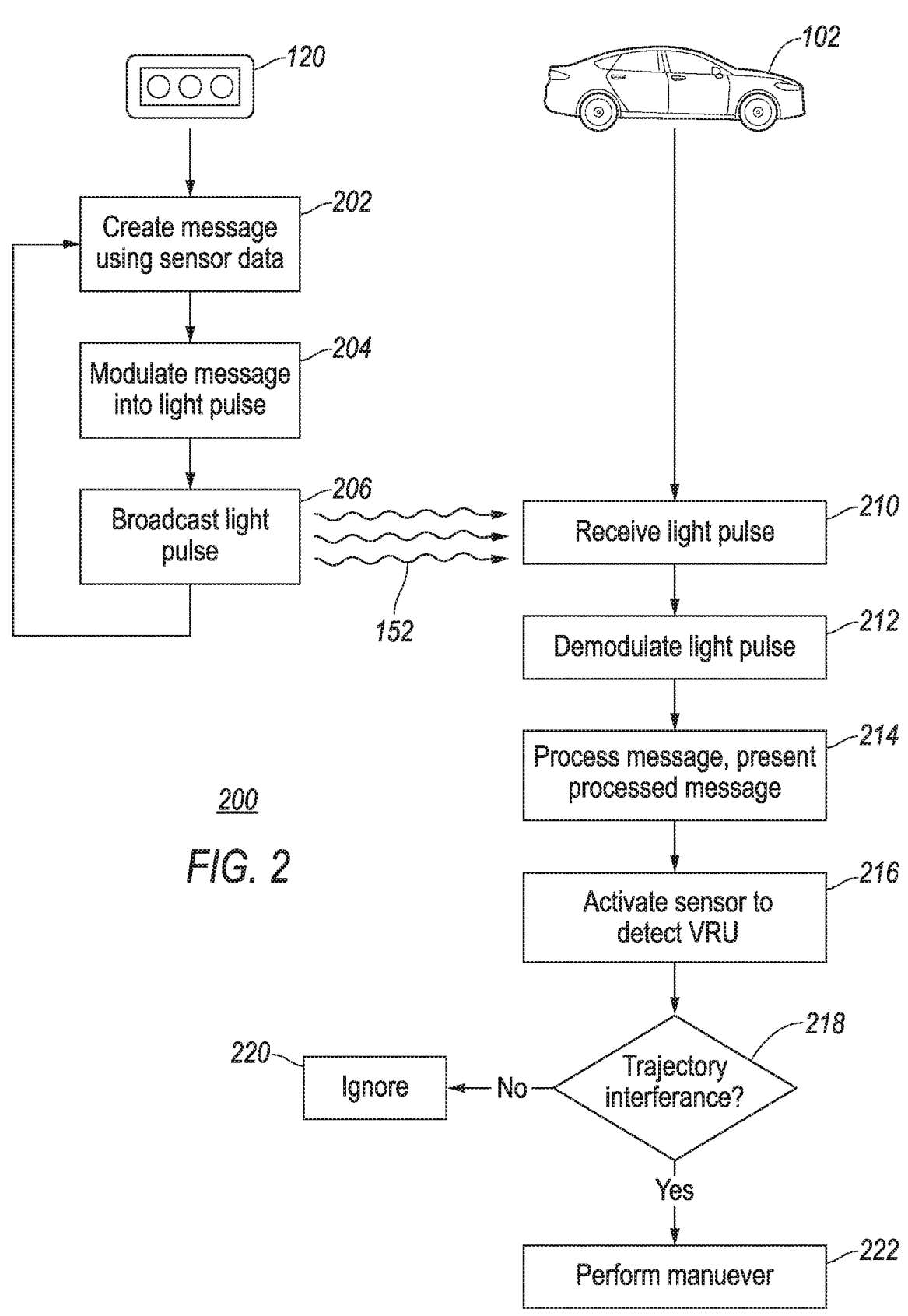
FIG. 2 illustrates an example flow diagram of a process for detecting the illumination device and operating the vehicle.

Referring to FIG. 2, an example flow diagram of a process 200 for detecting the illumination device 120 and operating the vehicle 102 is illustrated. With continuing reference to FIG. 1, at operation 202, responsive to being activated by the vulnerable road user, the illumination device 120 creates a message 151 using various data from the sensors 160. As discussed above, the message 151 may include pre-recorded static information such as the identifier of the road user, a user category of the road user, or the like. The message 151 may further include dynamic information such as location information indicative of the location of the user, motion information (e.g. speed, direction) indicative of the motion of the user, information indicative of the intent of the user (e.g., as determined from the various sensors 160 and controllers 158 of the illumination device 120).

At operation 204, the illumination device 120 modulates (e.g., encodes) the message 151 into a light pulse 152 to be broadcasted. There are multiple methods and protocols to modulate digital data onto light. For instance, the illumination device 120 may modulate the message 151 using one or more of an amplitude-shift keying (ASK), a frequency-shift keying (FSK), and/or a phase-shift keying (PSK). The illumination device 120 may be provided with device applications 156 to perform the modulation by the processor 154.

At operation 206, the illumination device 120 broadcasts the light pulse 152 using the emitter 150. On the illumination device 120 side, the process 200 returns to operation 202 to continue to create updated messages 151 based on new sensor 160 data such as updated location and motion information.

Depending on the intensity and power configuration of the emitter 150 of the illumination device 120, the light pulse 152 may be associated with a transmission range. This transmission range may range from tens of meters to a few hundreds of meters. Depending on the time of the day, weather conditions and other conditions, the transmission range may be or may not be within the sight of the driver of the vehicle 102. If the vehicle 102 is within the transmission range, at operation 210 the vehicle 102 may receive the light pulse 152. As discussed above, the vehicle 102 may be provided with one or more receiving devices such as the camera 118 and/or the light sensor 140 to receive the light pulse 152.

Responsive to receiving the light pulse 152 broadcast from the illumination device 120, the vehicle 102 demodulates (e.g., decodes) the light pulse 152 into the message 151 at operation 212. The demodulation operation 212 may be performed by the processor 106 as assisted by the corresponding vehicle application 108.

At operation 214, the vehicle 102 processes the message 151 to generate a processed message. This processed message 151 may be presented to the vehicle driver via the HMI controls 112. The original message 151 as received and demodulated may include raw data of the illumination device 120 which may be difficult for a driver to understand. Converting the raw data into a processed format may facilitate a mutual understanding of the situation, especially to the driver of the vehicle 102.

For instance, the original message 151 may include raw coordinate data such as latitude, longitude and elevation to indicate the location of the vulnerable road user. However, the location data in the original format (e.g. coordinates) may be difficult for the vehicle 102 driver to understand. To address that, the computing platform 104 may generate the processed message using both original message 151 and the vehicle information from various vehicle sensors 140. The processed message may be more easily understandable by the driver compared with the original message. Continuing with the above location example, responsive to obtaining the location data of the illumination device 120 and therefore the location of the vulnerable road user in the coordinates format, the computing platform 104 converts the location data of the illumination device 120 into a format that is relevant to the current location of the vehicle 102 in the processed message and outputs the processed message to the vehicle driver via the display 114 and/or the speaker 122. As an example, instead of indicating the coordinates of the illumination device 120, the processed message may include information such as "Watch out for pedestrian ahead at 50 meters on the right side," or "Oncoming bicycle is approach you at 20 mph." The processed message output by the vehicle 102 may give the driver an advanced notice about the vulnerable road user even if the drive has not seen the vulnerable road user yet such that the driver may have longer time to respond to the situation if any driving maneuvers are needed (e.g. reducing speed).

As discussed above, the vehicle 102 may be provided with autonomous driving features to automatically respond to the vulnerable road user. At operation 216, the vehicle 102 activates vehicle sensors 140 to detect the vulnerable road user in preparation to perform driving maneuvers (if any) in response. As discussed above, the vehicle 102 may be provided with sensors 140 and cameras 118 to detect objects in facilitation of the autonomous driving features.

Responsive to detecting the vulnerable road user via the sensors 140 and/or cameras 118, the vehicle 102 analyzes the data and determine if an interference between the current trajectory of the vehicle 102 and a trajectory of the vulnerable road user is expected at operation 218. Despite receiving the light pulse 152 from the illumination device 120, sometimes the trajectory of the vulnerable road user and the trajectory of the vehicle 102 do not overlap. If this is the case, the process 200 proceeds to operation 220 and the vehicle 102 ignore the vulnerable road user. This scenario may happen, for example, when a wheelchair or pedestrian vulnerable road user is using a dedicated lane (e.g. sidewalk) which does not interfere with a vehicle 102 lane on which the vehicle 102 is traversing.

Otherwise, if the vehicle 102 determines the there is an interference between the trajectory of the vehicle 102 and the trajectory of the vulnerable road user, the process 200 proceeds from operation 218 to operation 222 and the vehicle 102 performs driving maneuvers to mitigate the situation. For instance, if a bicycle vulnerable road user is riding on the right side of the vehicle lane on which the vehicle 102 is traversing, or the bicycle although not currently in the vehicle lane but has the intent to cross lanes as indicated in the message 151, an interference of trajectories may be detected. In response, the vehicle 102 may reduce the speed in advance and/or leave more space from the vulnerable road user when passing. Additionally or alternatively, the BCM 136 of the vehicle 102 may perform operations on the lights (e.g. activating the headlights of the vehicle 102) and horn (e.g., gently activating the horn) to notify the vulnerable road user about the presence of the vehicle 102.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle, comprising:
   a human machine interface (HMI);
   a light sensor configured to receive a light pulse emitted from an illumination device, wherein the light pulse includes an original message in a modulated format; and
   one or more controllers programmed to
      demodulate the light pulse to obtain the original message, wherein the original message identifies an object on which the illumination device is attached, and includes a coordinate of the illumination device,
      convert the original message including the coordinate into a processed message including a relative location with reference to the vehicle, wherein the relative location includes a direction relative to the vehicle and a distance between a location of the vehicle and a location of the coordinate, and output the processed message including the relative location via the HMI.

2. The vehicle of claim 1, wherein the one or more controllers are further programmed to notify presence of the vehicle due to proximity of the vehicle to the illumination device by performing at least one of activating a light of the vehicle or activating a horn of the vehicle.

3. The vehicle of claim 1, further comprising a second sensor configured to detect objects, wherein the one or more controllers are further programmed to:

responsive to demodulating the light pulse and identifying the object, activate the second sensor to detect the object and determine a motion trajectory of the object based on data from the second sensor, determine if the object interferes with a current vehicle trajectory using the motion trajectory of the object, and responsive to detecting the object interferes with the current vehicle trajectory, perform a driving maneuver.

4. The vehicle of claim 3, wherein the driving maneuver includes at least one of reducing a vehicle speed or steering the vehicle to leave a distance from the object while passing the object.

5. The vehicle of claim 1, wherein the original message includes at least one of: a location of the illumination device, or a motion speed and direction of the illumination device.

6. The vehicle of claim 1, wherein the original message includes an object category indicating the object being at least one of: a pedestrian, a bicyclist, a roadway worker, or a wheelchair.

7. The vehicle of claim 1, wherein the light pulse is visible light having a wavelength range of 400 to 700 nm.

8. The vehicle of claim 1, wherein the light pulse is infra-red light.

9. The vehicle of claim 1, wherein the processed message further includes speed of the object relative to the vehicle.

10. A method for a vehicle, comprising:

responsive to receiving, via a light senor, a light pulse emitted from an illumination device, demodulating the light pulse to obtain an original message identifying an object and indicating a coordinate of the object;

converting the coordinate into a relative location with reference to the vehicle, wherein the relative location includes a direction, a distance and a speed between a location of the vehicle and a location of the object;

detecting, via a second sensor, the object; and performing, via one or more controllers of a vehicle, a driving maneuver to evade the object.

11. The method of claim 10, further comprising:

performing, via the one or more controllers, at least one or of activating a light of the vehicle, or activating a horn of the vehicle.

12. The method of claim 10, wherein the driving maneuver includes at least one of: reducing speed of the vehicle or steering the vehicle to leave a distance from the object while passing the object.

13. The method of claim 10, wherein the original message includes coordinates of the illumination device, the method further comprising:

generating, via the one or more controllers, a relative location with reference to the vehicle using the coordinates of the original message;

incorporating, via the one or more controllers, the relative location into a processed message; and outputting, via a human-machine interface, the processed message.

14. The method of claim 10, wherein the light pulse is in a form of visible light having a wavelength range of 400 to 700 nm.

\* \* \* \* \*